United States Patent
Koh et al.

(10) Patent No.: US 7,200,654 B2
(45) Date of Patent: Apr. 3, 2007

(54) METHOD OF CONSTRUCTING AND MANAGING OVERLAY MULTICAST TREE ON INTERNET

(75) Inventors: Seok Joo Koh, Daejeon (KR); Ju Young Park, Daejeon (KR); Shin Gak Kang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 565 days.

(21) Appl. No.: 10/675,604

(22) Filed: Sep. 29, 2003

(65) Prior Publication Data
US 2004/0088309 A1 May 6, 2004

(30) Foreign Application Priority Data
Nov. 6, 2002 (KR) .................... 10-2002-0068477

(51) Int. Cl.
*G06F 15/173* (2006.01)
*G06F 11/00* (2006.01)
*H04L 12/28* (2006.01)

(52) U.S. Cl. .................... 709/223; 709/238; 370/216; 370/389

(58) Field of Classification Search .................... None
See application file for complete search history.

(56) References Cited

U.S. PATENT DOCUMENTS 5,831,975 A * 11/1998 Chen et al. .................. 370/256
6,275,859 B1 * 8/2001 Wesley et al. ............... 709/229
6,427,166 B1 * 7/2002 Hurst et al. .................. 709/220
6,507,562 B1 * 1/2003 Kadansky et al. ........... 370/216
2002/0150094 A1 * 10/2002 Cheng et al. ................ 370/389

FOREIGN PATENT DOCUMENTS

| KR | 1020010039241 | 5/2001 |
|----|---------------|--------|
| KR | 1020020023100 | 3/2002 |
| KR | 1020020054216 | 7/2002 |

* cited by examiner

Primary Examiner—Wen-Tai Lin
(74) Attorney, Agent, or Firm—Blakely Sokoloff Taylor & Zafman

(57) ABSTRACT

Disclosed herein is a method of constructing and managing an overlay multicast tree on the Internet. The overlay multicast tree includes a sender, one or more receivers and one or more agents for relaying data. At the first step, a new participant requests access to the overlay multicast tree from a tree manager while transmitting network characteristic information thereof to the tree manager. The second step is determining an optimal parent node in consideration of the network character information of the new participant having requested access at the first step and network characteristic information of agents participating in a currently constructed overlay multicast tree, and transmitting information of the determined parent node to the new participant. The new participant establishes data channels on the basis of the information of the determined parent node at the third step.

4 Claims, 5 Drawing Sheets

METHOD OF CONSTRUCTING AND MANAGING OVERLAY MULTICAST TREE ON INTERNET

BACKGROUND OF THE INVENTION

1. Field of the Invention

The present invention relates to a method of constructing and managing an overlay multicast tree on the Internet, which enables the construction of a balanced overlay multicast tree and the continuous management of status of the overlay multicast tree, thus increasing the efficiency of use of network resources.

2. Description of the Prior Art

Internet transmission-methods may be classified into tree types: unicast in which a single sender transmits data to a single receiver, broadcast in which a single sender transmits data to all the receivers on the same subnet, and multicast in which a single sender transmits data to multiple receivers.

Of these transmission methods, multicast allows a sender to transmit a message to multiple receivers simultaneously, thus minimizing waste of network resources, and is useful in applications, such as Internet videoconferencing.

The conversion of the unicast-based Internet into a multicast-based Internet is restricted, however useful the multicast.

Accordingly, Korean Pat. Appl. No. 2001-029308 entitled "System for construction of virtual multicast network" proposes overlay multicast that allows multicast services to be utilized in a non-multicast environment.

The overlay multicast is a transmission method, in which a plurality of agents are installed on the existing unicast-based Internet, a sender, receivers and agents are configured in a tree structure and the sender transmits multicast data to the receivers through the use of the relaying function of the agents. The overlay multicast is a kind of multicast implemented and performed in the layer of an overlay.

With such an overlay multicast transmission technology, multicast application services, such as live Internet broadcasting, distance education and Internet videoconferencing, can be implemented over a unicast network without the construction of an additional multicast network or conversion of an existing unicast network into a multicast network.

FIG. 1 is a diagram showing the basic construction of an overlay multicast tree that connects a sender terminal 11 with receiver terminals 31~36 over the Internet.

An existing multicast tree is a tree that connects network routers, while an overlay tree is a tree, which connects information terminals operated in an upper application layer and in which information terminals called agents 21~24 are employed to perform the relayed transmission of data.

Each of the agents 21~24 is a node that can have one or more child nodes (that is, one or more other agents, or one or more receivers), and may be a server computer separately installed on a network or software implemented in a receiver terminal.

The agent 21, 22, 23 or 24 functions to receive data from a sender or upstream agent, and relays the data to its child nodes (one or more downstream agents or one or more receiver terminals).

When the construction of the overlay tree starts (that is, a session starts), each of the receiver terminals 31~36 accesses a tree manager (not shown) and requests upstream node information from the tree manager, and the tree manager randomly selects a parent node and reports the parent node to the receiver terminal 31, 32, 33, 34, 35 or 36. Once the parent node has been selected, a data channel is established between the child node and the parent node by the child node requesting data transmission from the parent node.

In this case, a multicast type data channel is chiefly utilized, but a multicast type data channel may be utilized if multicast transmission can be performed on a corresponding network.

However, up till now, in order to construct a tree for overlay multicast transmission, upstream agents have been randomly allotted to each agent and one or more receivers, so an overlay multicast tree has not been well balanced, and therefore transmission delay could be increased between a sender and receivers. Additionally, the characteristic information of a network, such as the availability of multicast, has not been taken into consideration at the time of constructing the overlay multicast tree, so a unicast channel has been constructed notwithstanding that a multicast channel is available. Furthermore, excessive levels are constructed between a sender and receivers as the result of the above, so the efficiency of data transmission and the efficiency of use of network resources have been reduced.

SUMMARY OF THE INVENTION

Accordingly, the present invention has been made keeping in mind the above problems occurring in the prior art, and an object of the present invention is to provide a method of constructing and managing an overlay multicast tree on the Internet, which determines an appropriate parent node in consideration of the characteristics of a network on which agents and receivers are positioned, the levels of the agents on the overlay multicast tree and the numbers of child nodes of the agents at the time of constructing the overlay multicast tree, thus enabling the construction of a well-balanced tree and continuous status management.

Another object of the present invention is to provide a method of constructing and managing an overlay multicast tree on the Internet, in which agents periodically reports the status of the overlay multicast tree to a tree manager during a session, so the tree manager can be aware of the construction of the entire overlay multicast tree during the session.

In order to accomplish the above object, the present invention provides a method of constructing and managing an overlay multicast tree on the Internet, the overlay multicast tree including a sender, one or more receivers and one or more agents for relaying data, comprising the first step of a new participant requesting access to the overlay multicast tree from a tree manager while transmitting network characteristic information thereof to the tree manager; the second step of determining an optimal parent node in consideration of the network character information of the new participant having requested access at the first step and network characteristic information of agents participating in a currently constructed overlay multicast tree, and transmitting information of the determined parent node to the new participant; and the third step of the new participant establishing data channels on the basis of the information of the determined parent node.

Preferably, the method further may comprise the fourth step of the agent transmitting information of child nodes currently held thereby to the tree manager at regular intervals after having accessed the overlay multicast tree through the first, second and third steps, and the tree manager collecting the transmitted information of child nodes and checking and managing status of the overlay multicast tree.

Preferably, the new participant may provide subnet ID information of a network thereof when requesting access to the overlay multicast tree from the tree manager.

Preferably, the second step comprises the steps of searching nodes on a currently constructed overlay multicast tree for any nodes having the same subnet ID as the new participant; selecting a node having a minimal tree level or minimal number of child nodes from among the nodes having the same subnet ID if one or more nodes having the same subnet ID are searched for; selecting a node having a minimal tree level or minimal number of child nodes from among all nodes of the overlay multicast tree if one or more nodes having the same subnet ID are not searched for; and determining the selected node as a parent node and notifying the new participant of the selected node via a response message.

Preferably, the fourth step may be performed in such a way that each of the nodes having accessed the overlay multicast tree starts a status report timer with a status report interval set, transmits information of child nodes connected thereto to the tree manager when the status report timer reaches the set interval, and restarts the status report timer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
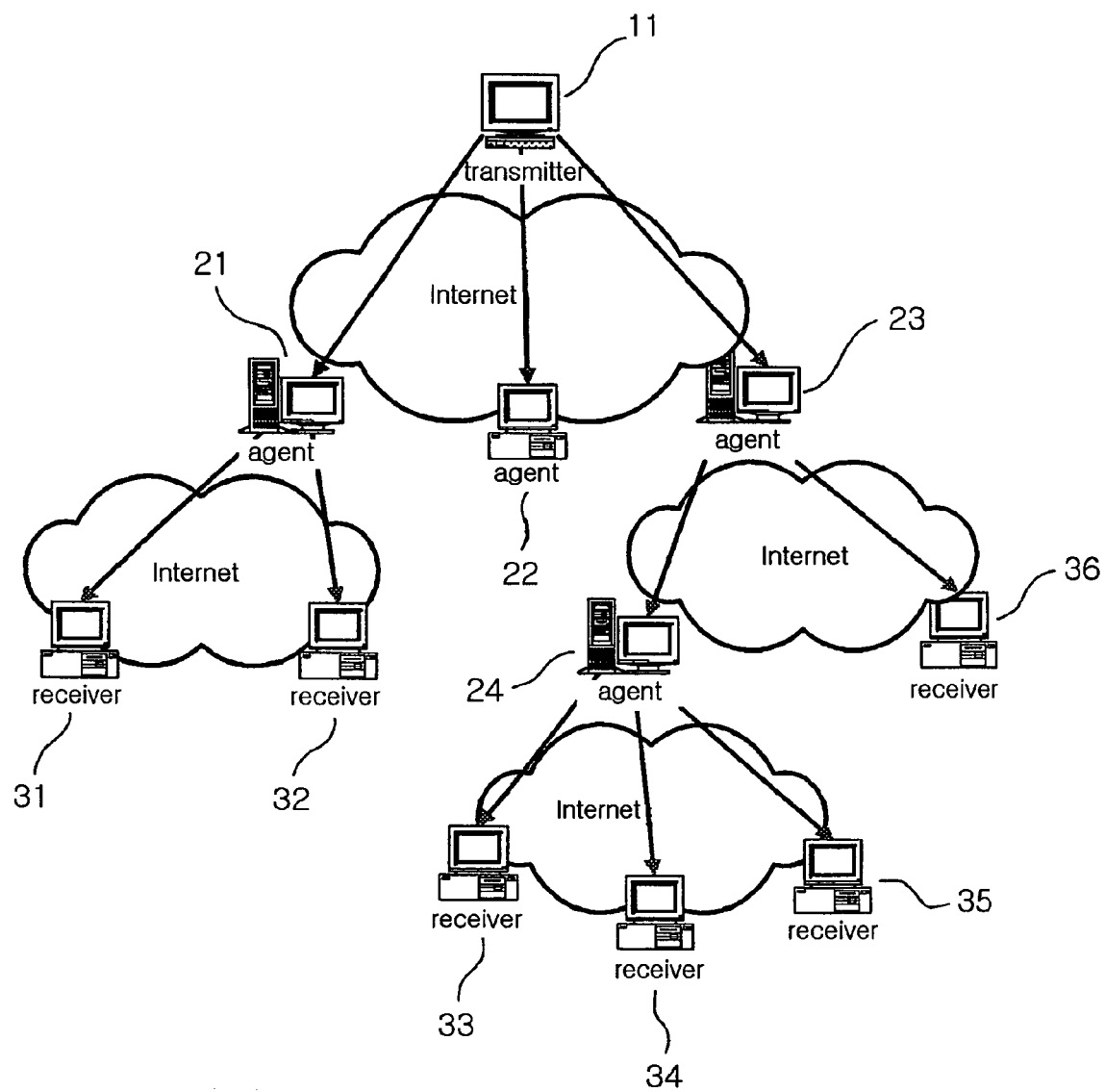
FIG. 1 is a diagram showing the general construction of an overlay multicast tree.

Reference now should be made to the drawings, in which the same reference numerals are used throughout the different drawings to designate the same or similar components.

Figure 2:
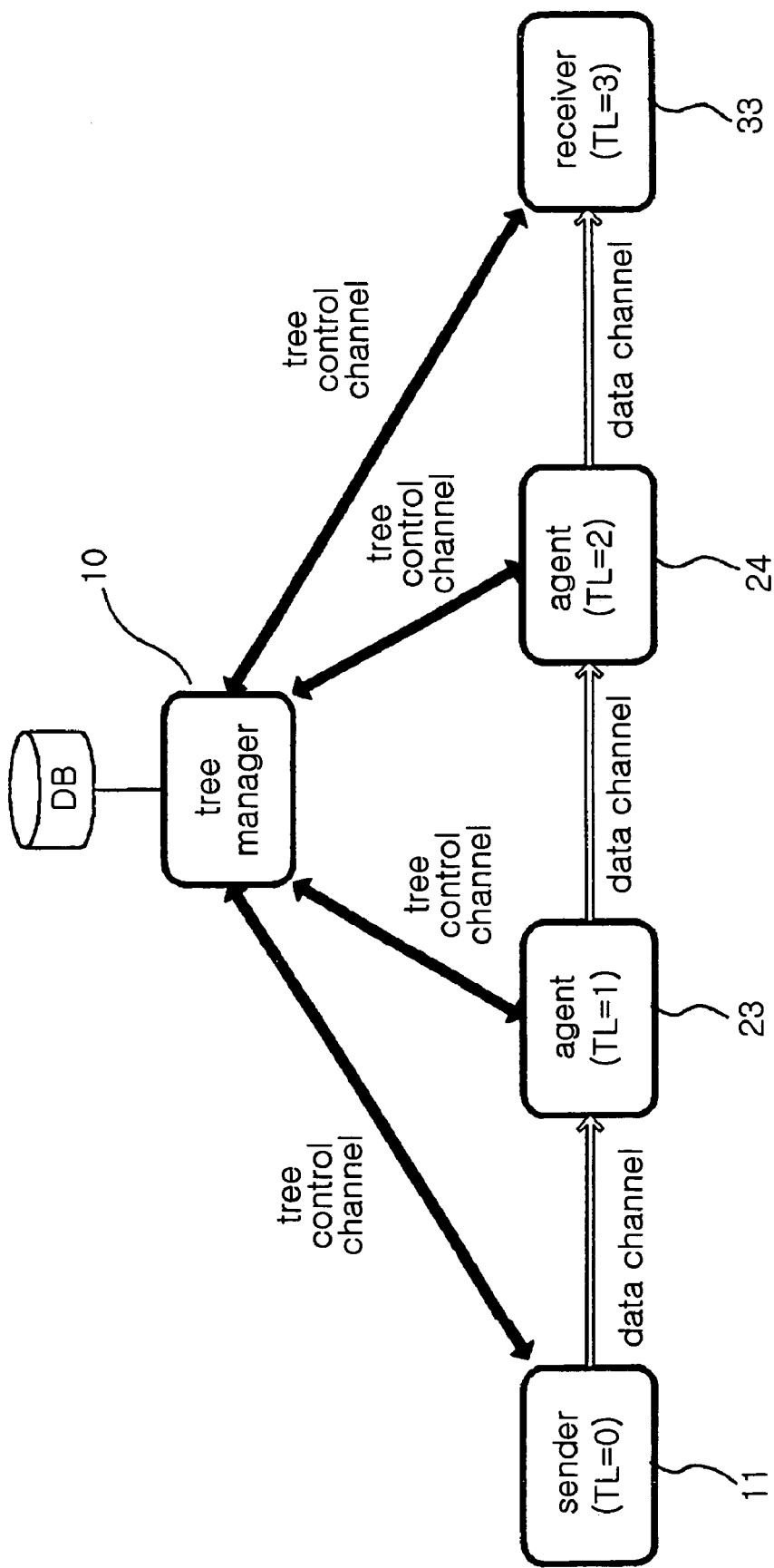
FIG. 2 is an example showing the construction of data channels and tree control channels for transmitting data and managing an overlay multicast tree.

FIG. 2 is a diagram showing the entire construction of a system for constructing an overlay multicast tree and the construction of channels thereof.

First, the basic process of constructing and managing an overlay multicast construction and management is described. In order to construct and manage the overlay multicast tree, each of participants (agents and a receiver) 23, 24 and 33 establishes a tree control channel between a tree manager 10 and itself.

Through the established tree control channel, each participant, that is, each of the agent 23 and 24 and the receiver 33, transmits a tree access request message to the tree manager 10, and the tree manager 10 determines an optimal upstream parent agent in response to the tree access request message in a way described below and transmits a determined result to the participants via a response message. The above-described process is performed by the receiver 33, the agents 23 and 24 and the tree manager 10, in due order.

Thereafter, data channels are established between the participants according to the determination of the parent node by the tree manager 10, and data is transmitted through the established data channels.

During data transmission, each of the agents 23 and 24 periodically transmits tree status information, including its child node information (for example, Internet Protocol (IP) address), to the tree manager 10 through each of the tree control channels. With this transmission of the tree status information, the tree manager 10 can be aware of the construction of an entire tree during a session and manage the information of the construction of the tree.

In this case, the tree levels (hereinafter referred to as "TLs") of the nodes of the overlay multicast tree are set. For instance, the TL of the sender is set to "0", the TL of the child node of the sender is set to "1", the TL of the child node of the child node of the sender is set to "2", and the TL of the child node of the child node of the child node of the sender is set to "3".

Figure 3:
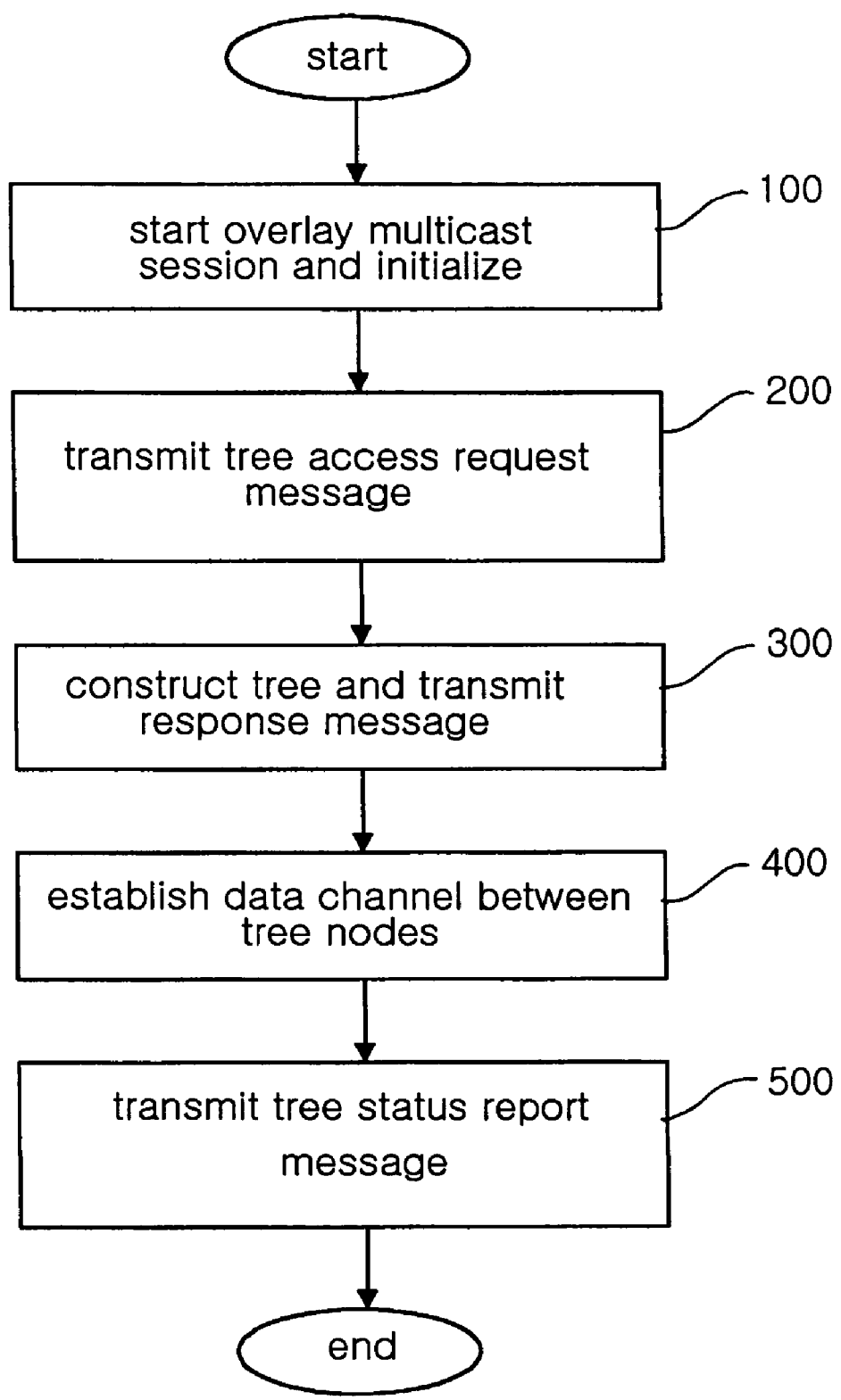
FIG. 3 is a flowchart showing a process for constructing and managing an overlay multicast tree in accordance with the present invention.

FIG. 3 is a flowchart showing a process of constructing and managing an overlay multicast tree in accordance with the present invention.

First, when an overlay multicast session starts, the tree manager 10 ascertains the subnet ID of the sender 11 (an IP address and a subnet mask) and general session information (a session name and characteristics) and performs initialization at step 100.

Thereafter, each of the agents 23 and 24 and the receiver 33 that will participate in the session transmits a tree access request message to the tree manager 10 at step 200. In this case, the tree access request message includes its subnet Identification (ID) information so that multicast transmission may be utilized if the subnet IDs of two participants are the same. Generally, a multicast data channel has high data transmission efficiency compared to a unicast channel.

Subsequently, when the tree manager 10 receives the tree access request message, the tree manager 10 determines an appropriate parent agent in consideration of the subnet ID of a corresponding participant, along with the IDs, tree levels TLs and numbers of child nodes ACs of agents participating in a multicast tree, and notifies the corresponding participant of the determined parent agent at step 300.

Additionally, when the corresponding participant, that is, a receiver or agent, receives information of its upstream node determined by the tree manager, the corresponding participant establishes a data channel between the determined parent node and itself at step 400.

Once the data channel is established, data is transmitted through the established channel.

One or more agents of the participants for which data channels are established transmit tree status report messages to the tree manager 10 at regular intervals after the data channels have been established. Each of the tree status report messages includes the information of child nodes connected to a corresponding agent.

With the construction described above, the construction and management of the appropriate overlay multicast tree is enabled.

Figure 4:
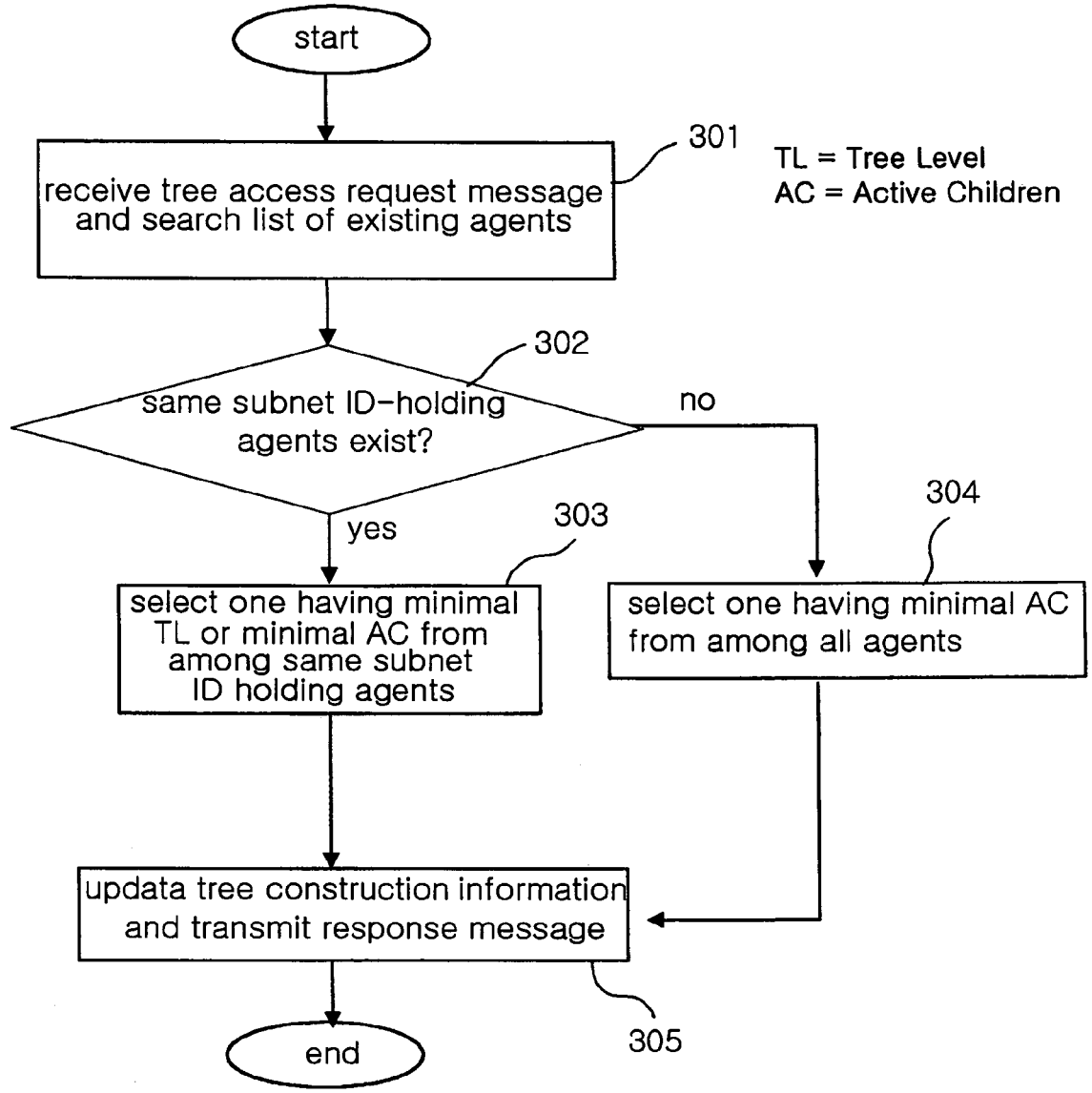
FIG. 4 is a flowchart showing, in detail, the steps of constructing a current overlay multicast tree and transmitting a response message so as to construct the overlay multicast tree in accordance with the present invention.

FIG. 4 is a flowchart showing the step 300 at which the tree manager having received the tree access request message from a new participant determines an appropriate parent node, constructs a current overlay multicast tree and notifies the new participant of the determined parent node, in detail. The construction process of the overlay multicast tree is described in detail in conjunction with the above step 300.

That is, when the tree manager receives a tree access request message from a new participant, the tree manager searches a list of existing agents at step 301.

At step 302, the tree manager determines whether existing agents holding the same subnet ID as the new participant exist.

If agents holding the same subnet ID as the new participant exist, one having a minimal tree level TL or the minimal number of child nodes AC is selected from among the same subnet ID-holding agents as a parent node of the new participant at step 303.

In contrast, if agents having the same subnet ID as the new participant do not exist, one having a minimal tree level TL or the minimal number of child nodes AC is selected from among all the agents as a parent node of the new participant at step 304.

Once the parent node of the new participant has been selected as described above, tree construction information is updated by including newly determined tree information therein and a response message to notify the receiver of the determined parent node is transmitted at step 305.

With the above-described step, the most effective tree construction is enabled.

Figure 5:
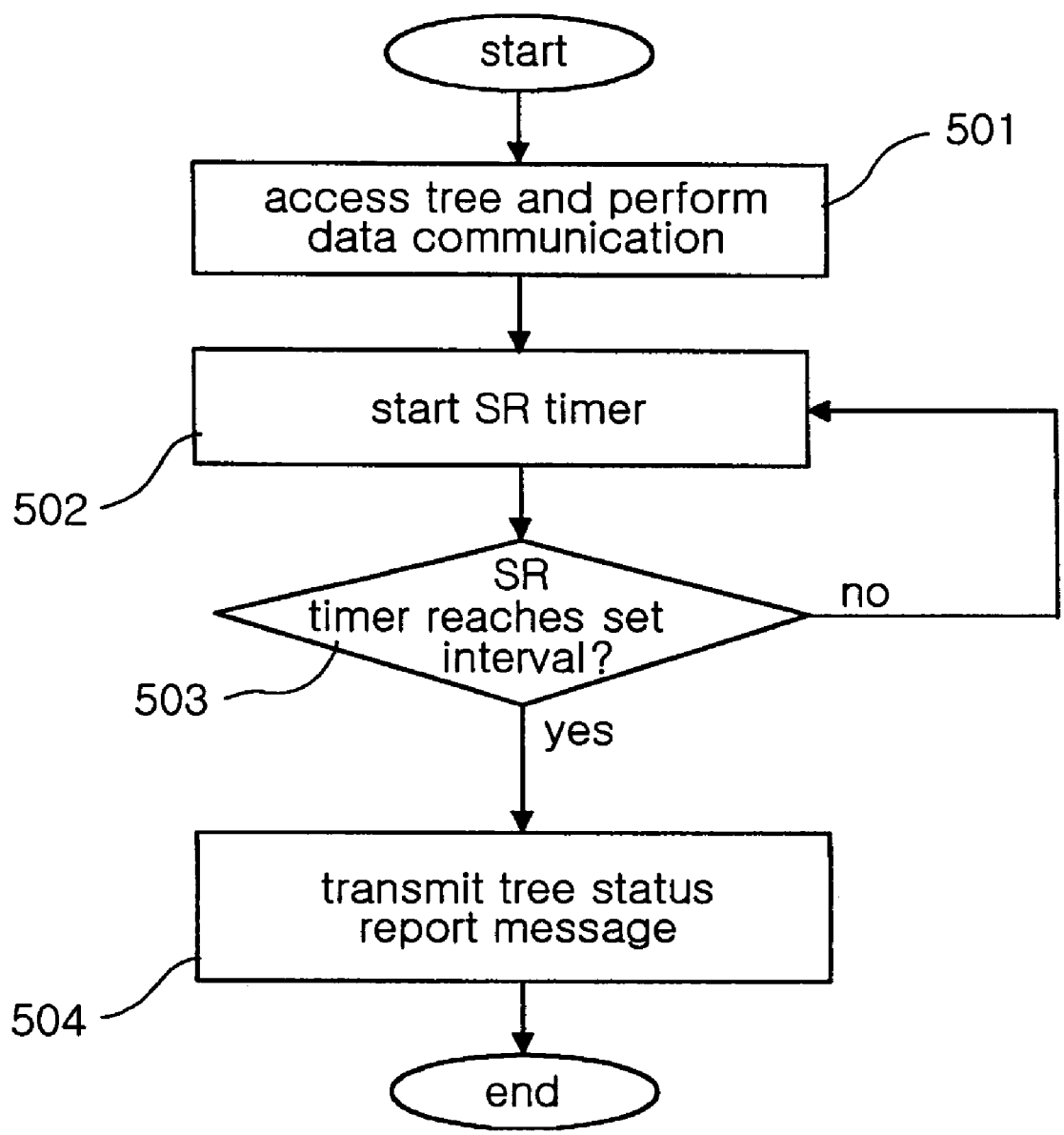
FIG. 5 is a flowchart showing, in detail, the step of an agent transmitting tree status report messages to a tree manager at regular intervals so as to allow the overlay multicast tree to be managed in accordance with the present invention.

FIG. 5 is a flowchart showing the step at which the agent transmits tree status report messages at regular intervals to the tree manager while accessing the overlay multicast tree in detail, in accordance with the tree construction and management method of the present invention.

As illustrated in FIG. 5, each of the agent nodes accesses the overlay multicast tree, and starts to perform data communication with the parent node (a sender or other agent) and one or more child nodes (receivers) at step 501.

At the same time that the performance of data communication is started, a Status Report (SR) timer is started with a certain report interval set at step 502. Thereafter, it is determined whether the SR timer has reached a set report interval at step 503, which is performed to check the report interval.

If the SR timer has reached the set report interval, the agent draws up a tree status report message including the information of child nodes (IP addresses) and transmits it to the tree manager at step 504.

After the tree status report message is transmitted as described above, the SR timer is restarted to reach the set report interval.

Accordingly, the tree status information is transmitted to the tree manager at regular intervals. As a result, the tree manager can check and manage the construction status of the entire overlay multicast tree.

As described above, the present invention provides a method of constructing and managing an overlay multicast tree, which is capable of constructing a balanced overlay multicast tree by determining an optimal parent node for a receiver on the basis of the network information of participants and the information of a currently constructed overlay multicast tree, and which is capable of allowing the current construction status of the overlay multicast tree to be continuously checked and managed by causing agents to report the status information of the overlay multicast tree to the tree manager at regular intervals during a session.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of constructing and managing an overlay multicast tree on the Internet, the overlay multicast tree including a sender, one or more receivers and one or more agents for relaying data, comprising:

requesting access by a new participant to the overlay multicast tree from a tree manager while transmitting network characteristic information thereof to the tree manager;

determining an optimal parent node in consideration of the network characteristic information of the new participant having requested access at the first step and network characteristic information of agents participating in a currently constructed overlay multicast tree, and transmitting information of the determined parent node to the new participant; and establishing data channels of the new participant on the basis of the information of the determined parent node, wherein the determining the optimal parent node includes searching nodes on the currently constructed overlay multicast tree for any nodes having a same subnet ID as the new participant;

selecting as a parent a node having a minimal tree level or minimal number of child nodes from the nodes having the same subnet ID if at least one node is found to have the same subnet ID as the new participant;

selecting as a parent a node having a minimal tree level or minimal number of child nodes from all the nodes of the overlay multicast tree if no nodes having the same subnet ID as the new participant are found; and notifying the new participant of the node selected as a parent via a response message.

2. The method as set forth in claim 1, further comprising: transmitting information by the agent of child nodes currently held thereby to the tree manager at regular intervals after having accessed the overlay multicast tree, and the tree manager collecting the transmitted information of child nodes and checking and managing status of the overlay multicast tree.

3. The method as set forth in claim 1 or 2, wherein the new participant provides subnet ID information of a network thereof when requesting access to the overlay multicast tree from the tree manager.

4. The method as set forth in claim 2, wherein the transmitting is performed in such a way that each of the nodes having accessed the overlay multicast tree starts a status report timer with a status report interval set, transmits information of child nodes connected thereto to the tree manager when the status report timer reaches the set interval, and restarts the status report timer.

* * * * *